United States Patent [19]
Anahid et al.

[11] Patent Number: 5,904,219
[45] Date of Patent: May 18, 1999

[54] VEHICLE SEAT AIR BLADDER PRESSURE SENSOR

[75] Inventors: Hassan Anahid, Troy; Joseph John Zwolinski, Warren; Liwen Xu, Troy, all of Mich.

[73] Assignee: General Motors Corporation, Detroit, Mich.

[21] Appl. No.: 09/007,346

[22] Filed: Jan. 15, 1998

[51] Int. Cl.[6] .................................................. B60K 28/00
[52] U.S. Cl. ..................... 180/273; 280/735; 297/DIG. 3
[58] Field of Search ............................ 280/735; 180/273; 417/231; 297/DIG. 3, 284.1; 137/488; 702/51

[56] References Cited

U.S. PATENT DOCUMENTS

| | | | |
|---|---|---|---|
| 3,672,699 | 6/1972 | De Windt | 180/273 |
| 4,190,286 | 2/1980 | Bentley | 297/284 |
| 4,385,863 | 5/1983 | Minor | 180/273 X |
| 4,619,481 | 10/1986 | Grudzinskas | 297/284 |
| 4,756,574 | 7/1988 | Andres et al. | 297/284 |
| 4,789,202 | 12/1988 | Alter | 297/284 |
| 4,803,744 | 2/1989 | Peck et al. | 5/453 |
| 5,503,428 | 4/1996 | Awotwi et al. | 280/730.2 |
| 5,533,795 | 7/1996 | Brooks | 180/273 X |
| 5,740,771 | 4/1998 | Sebastian | 123/188.4 |
| 5,846,354 | 12/1998 | Winston et al. | 152/418 |

*Primary Examiner*—Christopher P. Ellis
*Attorney, Agent, or Firm*—Patrick M. Griffin

[57] ABSTRACT

An air bladder type pressure sensor for a vehicle seat includes an integral pressure reservoir and interconnecting valves to keep the sensor membrane automatically properly inflated. An air pump refills the reservoir intermittently, while the reservoir keeps the membrane pressurized continually.

3 Claims, 3 Drawing Sheets

VEHICLE SEAT AIR BLADDER PRESSURE SENSOR

TECHNICAL FIELD

This invention relates to vehicle seat air bladder pressure sensors in general, and specifically to an air bladder pressure sensor with an integrated inflation maintenance feature.

BACKGROUND OF THE INVENTION

A continuing desire to tailor various vehicle functions and operations specifically to the size of a seat occupant has created a need for a non intrusive seat cushion pressure sensor to sense the actual weight of the seat occupant. From the sensed weight, the vehicle control system can, through suitable algorithms, extrapolate a height and size of the occupant based on standard human profiles. From the sensed weight and calculated height, occupant specific adjustments in other systems can be made.

One proposed pressure sensor is an air bladder, which is relatively simple and low cost. The bladder is comprised of a pressurized upper membrane with a sealed sensing volume below, which is forced down by the weight of the occupant. The consequent increase in air pressure in the bladder, read and measured by the vehicle's control system, would be used to calculate occupant weight. To work well, the bladder would have to be maintained within a given operative pressure range. Since the membrane material is inherently subject to a slow air pressure leakage, a means must be provided to make up for the leakage and maintain the proper bladder operating pressure. The current means to do so is an air pump and associated air accumulator, which senses whenever the bladder pressure has fallen below a defined threshold, and replenishes the bladder accordingly. Given the leakage rate of bladder, such a pump may need to cycle on and off quite frequently, and its size and capacity can be relatively large. The space within a vehicle interior available to store a pump and associated accumulator is limited, and the noise of frequent cycling may be objectionable.

SUMMARY OF THE INVENTION

The subject invention provides a air bladder type of pressure sensor with a novel, integral pressure reservoir that automatically keeps the bladder pressurized, thereby eliminating the need for an accumulator on the air pump and allowing the pump to cycle less frequently, only as needed to refill the reservoir.

In the preferred embodiment disclosed, the bladder consists of a flexible upper membrane that encloses a sensing volume beneath it and an integral air reservoir molded around the perimeter of the membrane. The reservoir is thinner than the working height of the upper membrane, so as not to interfere with the operation of the membrane as it is compressed. The reservoir has a lower inherent leakage rate than the membrane, and is kept pressurized, by an air pump, to a supply pressure that is substantially higher than the operating pressure of the sensor. Small, passively acting valves interconnect the reservoir to the sensing volume, opening when the pressure falls blow the desired operating pressure, and closing again when enough air has entered from the reservoir to restore the operating pressure. The air pump activates to restore the pressure in the reservoir only when its pressure has fallen to a threshold below the ideal supply pressure. Since the reservoir leaks far less, the pump need not run as frequently, and need not have its own accumulator, thereby reducing space requirements and noise.

BRIEF DESCRIPTION OF THE DRAWINGS

These and other features of the invention will appear from the following written description, and from the drawings, in which.

DESCRIPTION OF THE PREFERRED EMBODIMENT

Figure 1:
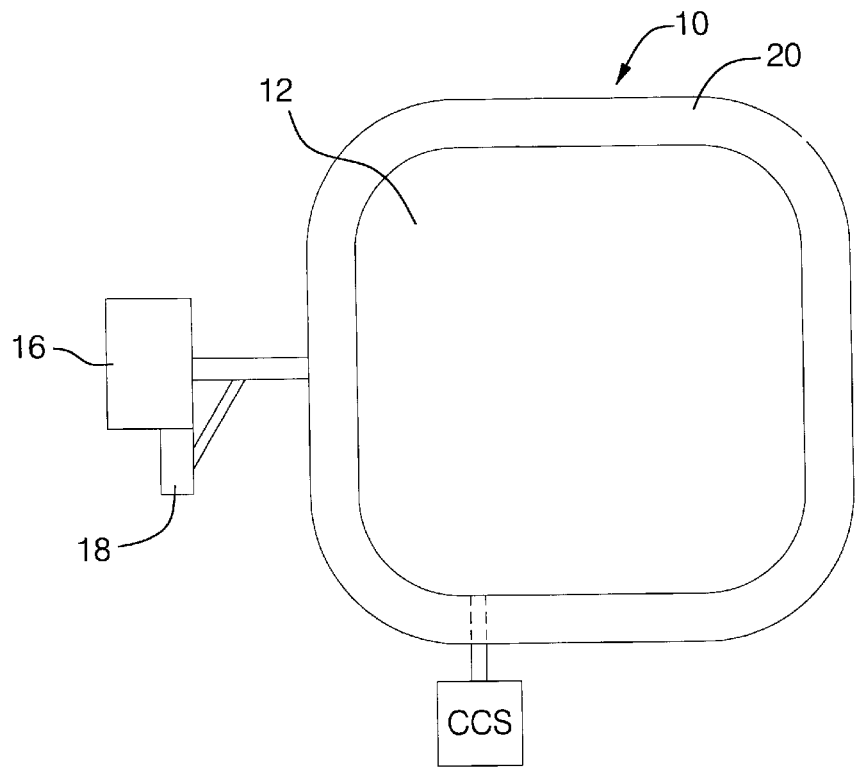
FIG. 1 is a schematic view of a pressure sensor made according to the invention, with an air pump shown generally.
Figure 2:
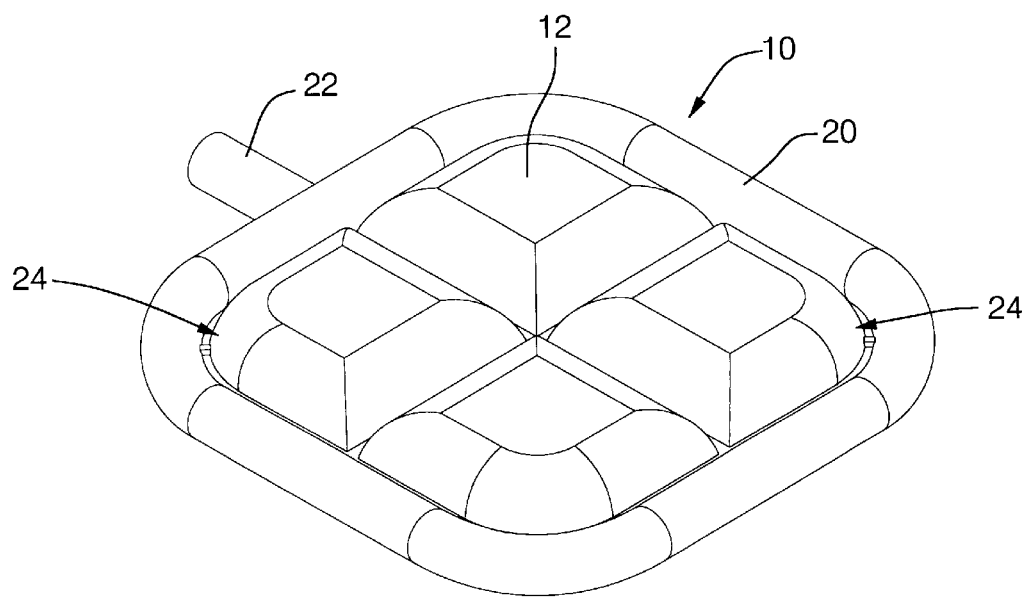
FIG. 2 is a more detailed perspective view of a preferred embodiment of the invention.
Figure 6:
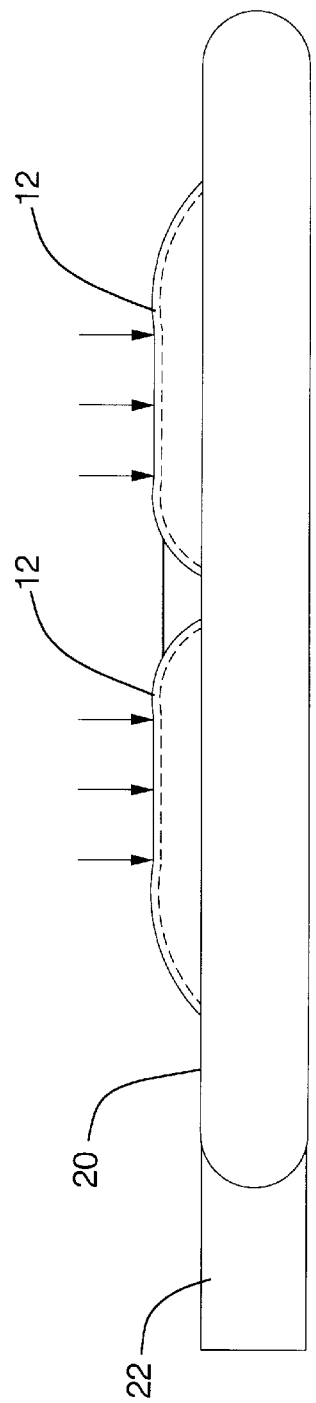
FIG. 6 is a side view of the sensor showing how the membrane is forced downwardly in operation.

Referring first to FIGS. 1, 2 and 6, a preferred embodiment of a pressure sensor made according to the invention is indicated generally at 10. Pressure sensor 10 is basically a pressurized, air filled bladder formed by an upper membrane 12 that encloses a sensing volume 14 below it. Membrane 12 is flexible and resilient, molded from a plastic material such as polyurethane. It may be continuous, or molded into a series of interconnected cells, as shown. In operation, sensor 10 would be incorporated in and just below a seat cushion surface, and the presence of an occupant would create a downward force on membrane 12, compressing it slightly as shown in FIG. 6, and consequently raising the pressure in volume 14. This rise in pressure would be detected by the vehicle's computer control system, and an estimation of the occupant size would be made, based on algorithms embedded in the system. The occupant size information could then be used to determine air bag inflation power, or to make in other vehicle adjustments desired. For best accuracy, the pressure in volume 10 should be maintained at an ideal, uncompressed operating pressure. Here, for example, the ideal operating pressure is 10 psi, and should be maintained within plus or minus one psi for proper operation. However, given the thinness of membrane 12, approximately 0.030 inch, and its relatively large surface area relative to the pressurized volume it covers, it is inherently permeable and subject to air leakage. The ideal operating pressure must, therefore, be actively maintained. This is done by an external air pump 16, which has its own air pressure sensor 18, but no associated accumulator, as would be conventional. Details of how pump 16 works in conjunction with novel features of sensor 10 are described next.

Figure 3:
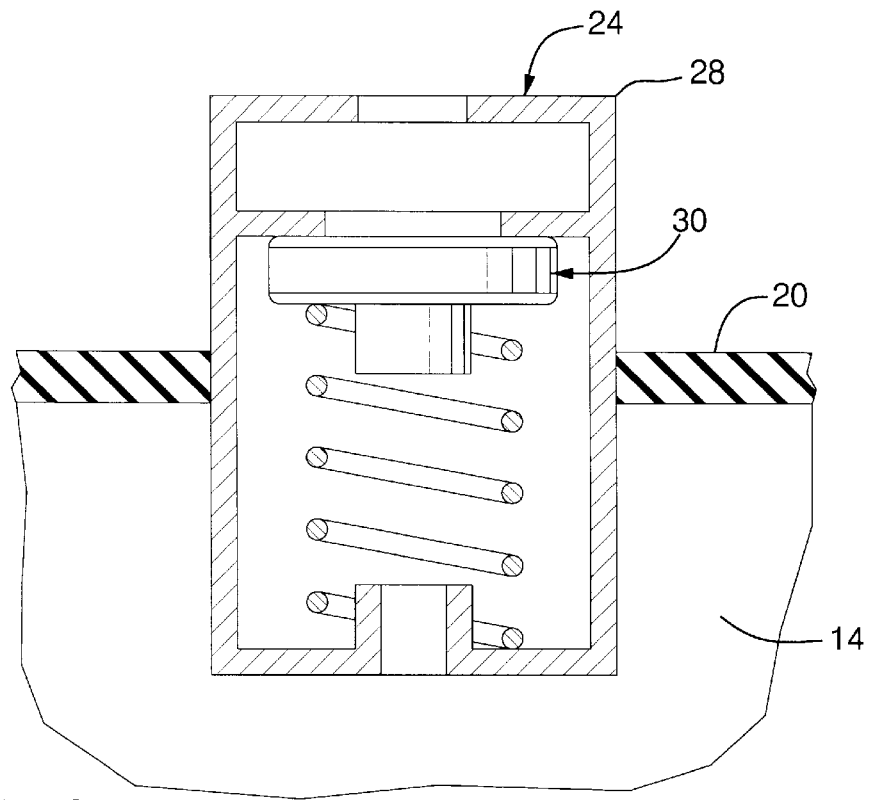
FIG. 3 is a cross section of a valve shown closed.
Figure 4:
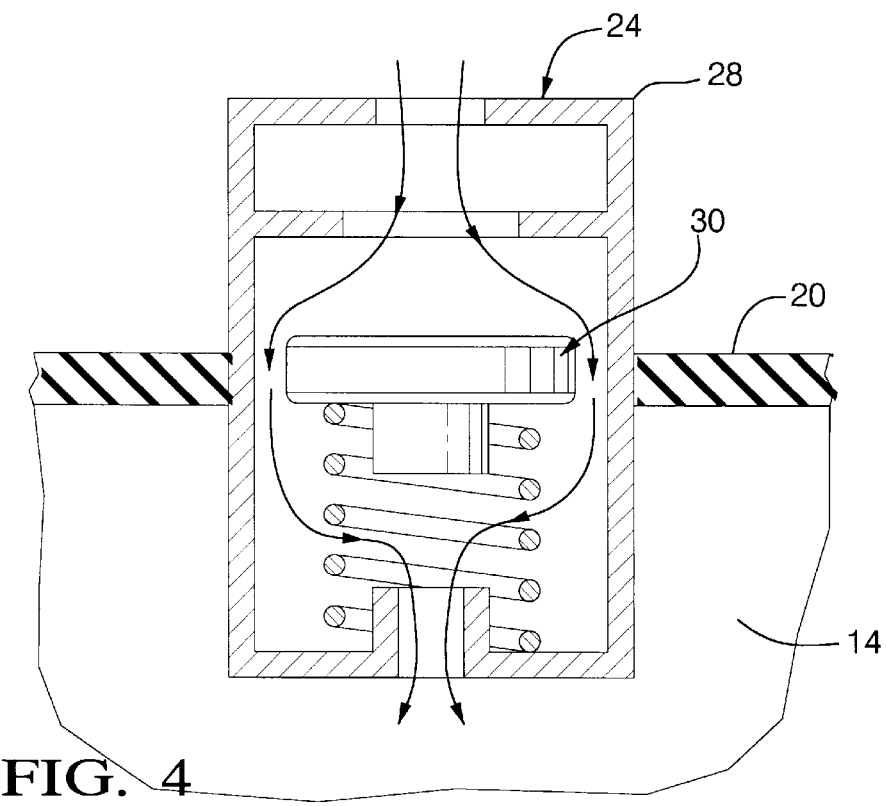
FIG. 4 is a cross section of a valve shown open.

Referring next to FIGS. 2 through 4, sensor 10 includes an pressure reservoir 20 molded around and to the perimeter of membrane 12. Reservoir 20 is molded of the same material, and in the same process as, membrane 12, so that the two are hermetically sealed as a unit. Reservoir 20 is generally in the form of a surrounding cylindrical pipe creating a four sided supporting frame for membrane 12. Reservoir 20 has an internal volume less than the sensing volume 14, but is maintained at a higher supply pressure of approximately twenty psi, or approximately twice the membrane operating pressure, by air pump 16. An integral inlet 22 on reservoir 20 is connected by a line to air pump 18. A series of four small micro valves, indicated generally at 24, are located at the four corners of the reservoir 20, interconnecting its interior to the sensing volume 14. Each micro valve 24 consists of a housing 28 inserted through the wall of reservoir 20 and into the sensing volume 14, with a passively spring loaded plunger 30 biased to keep the valve 24 normally closed. The strength of the spring loaded plunger 30 is set so as to be normally closed, but to open when the pressure in the sensing volume 14 falls to approximately eighty per cent of its ideal operating pressure of 10 psi, admitting make up air, as shown in FIG. 3. This restores the operating pressure within volume 14, but eventually lowers the supply pressure in reservoir 20. The opening and closing of valves 24 is passive, automatic, and substantially silent.

Figure 5:
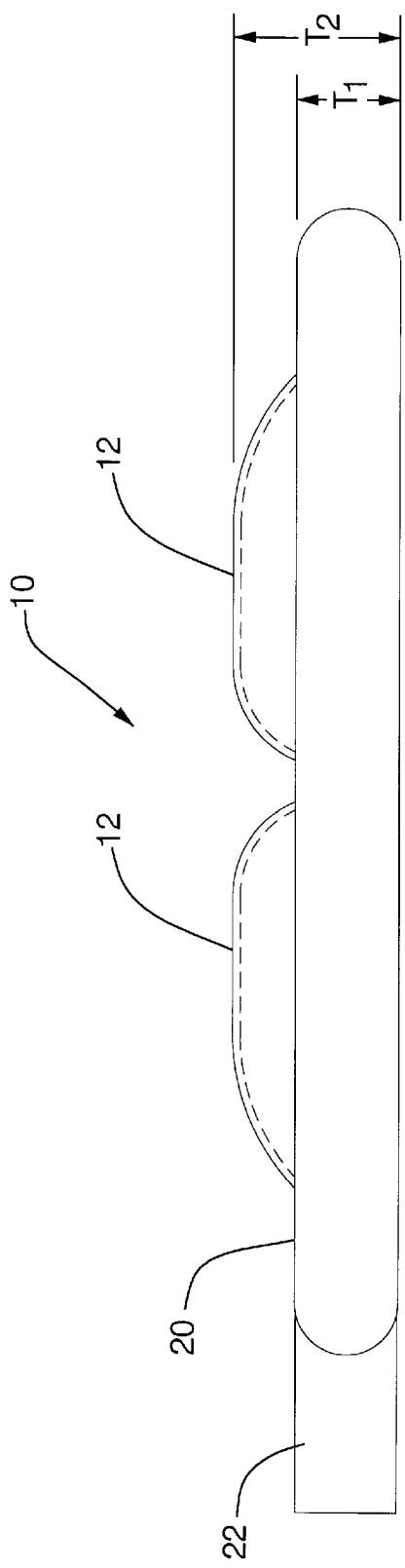
FIG. 5 is a side view of the pressure sensor of the invention, showing the relative heights or thicknesses of the upper membrane and the surrounding integral pressure reservoir.

Referring next to FIGS. 1 and 5, when the supply pressure in reservoir 20 falls to a certain threshold intermediate the ideal supply pressure and operating pressure, for example, to a pressure less that sixty five percent of its ideal supply pressure of 20 psi, the pump pressure sensor 18 is programmed to activate pump 16. Pump 16 then refills the reservoir 20 to its ideal supply pressure. Reservoir 20 retains its higher supply pressure more efficiently than the lower pressure membrane 12. Despite being molded of the same material and similar thickness as membrane 12, reservoir 20 can be made less permeable by coating its inner surface. This is more feasible than coating the undersurface of membrane 12, which is larger, and subject to compression that could brake the leak resistant coating. In addition, the cylindrical shape of reservoir 20 makes it a better pressure vessel than a large surface area membrane, given its smaller surface area to enclosed volume ration. Consequently, even at a higher pressure, reservoir 20 will have a far smaller inherent leakage rate than the membrane 12. Therefore, the pump 16 activates only infrequently to refill reservoir 20, far less frequently than the valves 24 open. This reduces noise considerably, and since there is no need for a separate accumulator with pump 16, space is conserved. Although reservoir 20 itself is an additional structure adjacent to membrane 12, it is designed so as to not interfere with the normal functioning of sensor 10. The membrane 12 has a characteristic working height or thickness, indicated at T1, while the reservoir 20 has a significantly lesser thickness T2. T2 is sufficiently smaller than T1 that membrane 12 will never be compressed down far enough to contact reservoir 20, and its proper operation will not be compromised, nor will the reservoir 20 be felt by the seat occupant.

Variations in the disclosed embodiment could be made. The reservoir 20 need not be molded integrally to the membrane 12, but could consist of another material, even a very rigid and thicker material, so long as its profile was low enough not to interfere with the operation of the sensor 10. The reservoir 20 need not completely surround the membrane 12, although that configuration does provide a convenient supporting frame and is easy to mold integrally to membrane 12. Therefore, it will be understood that it is not intended to limit the invention to just the embodiment disclosed.

We claim:

1. A vehicle seat surface air bladder type pressure sensor having an integrated inflation maintenance feature, comprising:

an air bladder comprising at least a flexible upper membrane with a perimeter and defining a pressurized sensing volume below said upper membrane having a predetermined operating pressure, said membrane being subject to inherent, continual air leakage that potentially reduces said operating pressure;

a pressure reservoir adjacent to said membrane perimeter and having an internal supply pressure substantially higher than said operating pressure, said reservoir having a substantially lower inherent air leakage;

an air supply pump connected to said pressure reservoir so as to activate and re pressurize said reservoir when said reservoir pressure falls to a threshold pressure intermediate said supply pressure and said operating pressure; and, at least one passive valve interconnecting said reservoir and sensing volume which opens to said reservoir when said bladder pressure falls below said operating pressure to admit higher pressure air from said reservoir and which closes when said operating pressure has been restored, whereby said sensing volume is kept continually pressurized from said reservoir by said valve, while said pump is activated only when said reservoir pressure falls to said threshold pressure.

2. A vehicle seat surface air bladder type pressure sensor having an integrated inflation maintenance feature, comprising:

an air bladder comprising at least a flexible upper membrane with a perimeter and defining a pressurized sensing volume below said upper membrane having a predetermined operating pressure, said sensing volume having a predetermined operating thickness and being subject to inherent, continual leakage that potentially reduces said operating pressure;

a pressure reservoir adjacent to said membrane perimeter having a thickness less than said sensing volume thickness and having an internal supply pressure substantially higher than said operating pressure, said reservoir having a substantially lower inherent air leakage;

an air supply pump connected to said pressure reservoir so as to activate and re pressurize said reservoir when said reservoir pressure falls to a threshold pressure intermediate said supply pressure and said operating pressure; and at least one passive valve interconnecting said reservoir and sensing volume which opens to said reservoir when said bladder pressure falls below said operating pressure to admit higher pressure air from said reservoir and which closes when said operating pressure has been restored, whereby said sensing volume is kept continually pressurized from said reservoir by said valve and maintained continually thicker than said adjacent reservoir, while said pump is activated only when said reservoir pressure falls to said threshold pressure.

3. A vehicle seat surface air bladder type pressure sensor having an integrated inflation maintenance feature, comprising:

an air bladder comprising at least a flexible upper membrane with a perimeter and defining a pressurized sensing volume below said upper membrane having a predetermined operating pressure, said sensing volume having a predetermined operating thickness and being subject to inherent, continual leakage that potentially reduces said operating pressure;

a pressure reservoir surrounding and integrally formed with said membrane perimeter as a supporting frame thereto, said reservoir having a thickness less than said sensing volume thickness and having an internal supply pressure substantially higher than said operating pressure;

an air supply pump connected to said pressure reservoir so as to activate and re pressurize said reservoir when said reservoir pressure falls to a threshold pressure intermediate said supply pressure and said operating pressure; and at least one passive valve interconnecting said reservoir and sensing volume which opens to said reservoir when said bladder pressure falls below said operating pressure to admit higher pressure air from said reservoir and which closes when said operating pressure has been restored, whereby said sensing volume is kept continually pressurized from said reservoir by said valve and maintained continually thicker than said adjacent reservoir, while said pump is activated only when said reservoir pressure falls to said reservoir pressure.

* * * * *